Sept. 10, 1957

S. C. ROCKAFELLOW 2,806,197

POWER VOLTAGE REGULATOR

Filed Nov. 5, 1954

INVENTOR.
STUART C. ROCKAFELLOW
BY
Atty.

_United States Patent Office_

2,806,197
Patented Sept. 10, 1957

2,806,197
POWER VOLTAGE REGULATOR

Stuart C. Rockafellow, Farmington, Mich., assignor to Robotron Corporation, Detroit, Mich., a corporation of Michigan Application November 5, 1954, Serial No. 467,041

11 Claims. (Cl. 323—22)

This invention relates to a voltage regulator and particularly to a type thereof utilizing a phase shift circuit which is responsive to changes in the input voltage of the system.

In a wide variety of applications, such as in resistance welding, it is necessary that there be maintained a constant voltage on the equipment being operated. In resistance welding work, for example, variation in voltage will substantially vary the heat applied to the weld and thereby materially affect the quality of the weld. Therefore, where a machine is adjusted for voltage occurring, for example, during a daytime operation where the voltage may be approximately 430 volts, the machine would be entirely out of adjustment for night operation where the voltage may rise as high as 520 volts. Similarly, in an electric oven operation, it is often highly essential that heat be maintained constant over long periods of time, often as much as several days. Again, fluctuations in voltage furnished to the equipment may seriously affect the quality of its operation.

This problem has been recognized for a period of time practically co-extensive with the industrial use of electrical energy and the very large number of devices have been proposed for controlling the voltage supplied to a point of use. However, insofar as I am aware, these devices have either been somewhat inaccurate or they have been extremely complicated.

Accordingly, a major object of the invention has been to provide a voltage regulating device which will operate from the input side of a system utilizing electrical energy.

A further object of the invention has been to provide such a device particularly adaptable to a resistance welding system and capable of controlling the voltage applied to a point of use within extremely narrow limits.

A further object of the invention has been to provide such a device, as aforesaid, which is relatively simple and hence inexpensive in both its original cost and in its maintenance.

A further object of the invention is to provide a device, as aforesaid, which will operate on the input side of a system utilizing electrical energy and will therefore minimize time lag necessarily existing between the appearance of a change in the input voltage and in its application to the point of use.

A further object of the invention is to provide a phase shift circuit for controlling a pair of back-to-back connected electric valves which are in turn connected for controlling the current supplied to an input transformer.

A further object of the invention is to provide a device, as aforesaid, in which the phase shift is controlled directly by changes in the voltage appearing in the supply line.

A further object of the invention is to provide a device, as aforesaid, which can be readily adjusted to meet given conditions, wherein the necessary adjustments are few in number and are easy to make.

A further object of the invention is to provide a device, as aforesaid, wherein the component parts can be readily modified to meet a wide variety of operating conditions.

Other objects and purposes of the invention will be apparent to persons acquainted with equipment of this general type upon reading of the following description and inspection of the accompanying drawings.

While the device of the invention is applicable to any inductive load, it has been developed primarily for use in the electric welding field and such use will be here employed for purposes of illustrating the invention.

General description

In general, the invention consists of a pair of back-to-back connected electric valves connected in series with the circuit to be controlled and having their control electrodes connected to the output of a phase shift circuit. A variable resistance is provided in the phase shift circuit for controlling the magnitude of a phase shift effected thereby, said variable resistance constituting a vacuum triode whose conductivity is determined by a potential varying in response to variations in the line voltage supplying the system.

Figure 1:
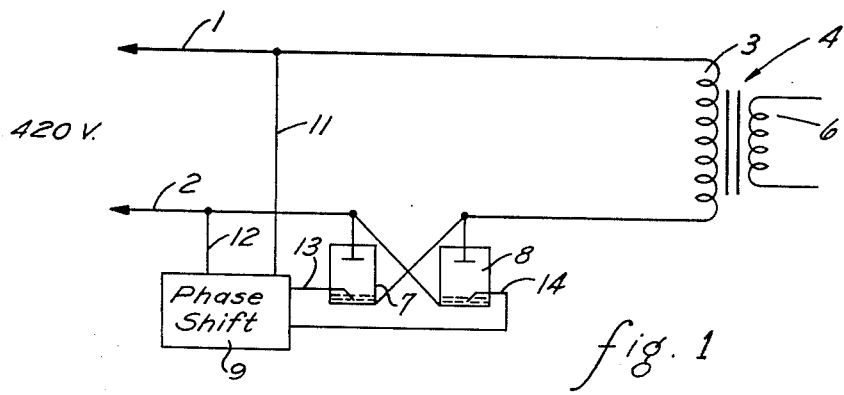
Figure 1 shows a schematic illustration of the broad concept of the invention and the problem met thereby.

Referring now to Figure 1, there is shown input conductors 1 and 2 supplying the primary winding 3 of a transformer 4. The secondary winding 6 of said transformer supplies a point of use, such as welding electrodes. A pair of electric valves, ignitrons or thyratrons according to the amount of current to be carried, herein shown as ignitrons, at 7 and 8 are connected in back-to-back relationship to each other and in series with the primary winding 3. A phase shift circuit 9 is provided which is energized directly by lines 11 and 12 from the input conductors 1 and 2 respectively. Said phase shift circuit supplies the control electrodes 13 and 14 of said electric valves.

Thus, where the voltage on the lines 1 and 2 increases in magnitude, the phase shift operates to shorten the period of conduction through the valves by a properly proportioned amount to maintain the output of the transformer at a constant level. When the input voltage on lines 1 and 2 diminishes, the phase shift then operates to lengthen the conductive period of said valves whereby to increase the output of the transformer. In this manner, since the load on the transformer is inductive, the output voltage is maintained constant and the objects of the invention are accomplished.

In actual practice, a device made according to the invention has held the output voltage constant within 2% change with the input voltage changing as much as 40%. Thus, a change in input line voltage from a voltage of 200 volts to a voltage of 280 volts has caused only a 4 volt change in the output.

Detailed description

Figure 2:
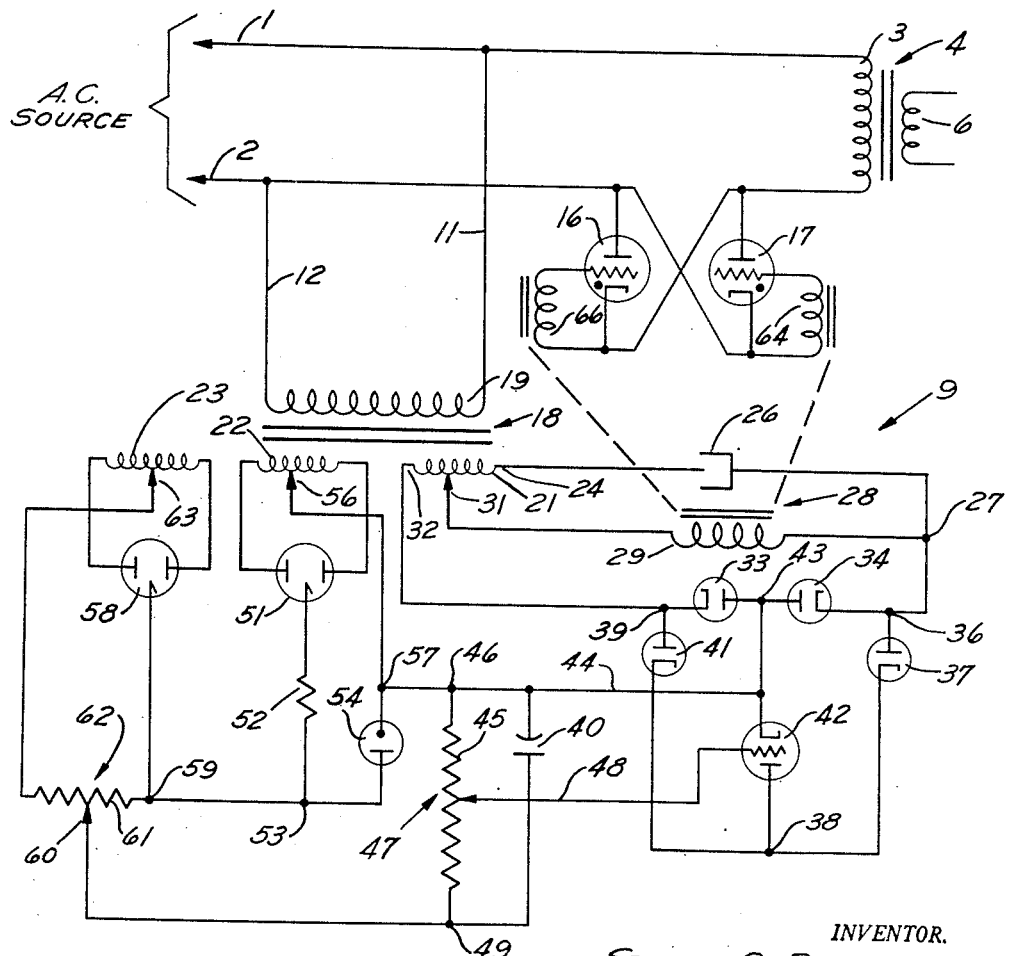
Figure 2 shows a particular circuit by which the invention may be carried out.

Turning now to Figure 2, there is shown in detail a specific circuit by which the purposes of the invention may be accomplished. In this circuit are shown the same input lines 1 and 2, transformer 4 having windings 3 and 6, all as above mentioned in connection with Figure 1. However, here the electric valves are shown as thyratrons instead of ignitrons and are therefore indicated by different reference numerals, namely, 16 and 17. Said thyratrons 16 and 17 are connected back-to-back with respect to each other and in series with the secondary winding 3 in the same manner as set forth in the circuit of Figure 1 in connection with the ignitrons 7 and 8.

Turning now to the phase shift circuit 9, there is provided a transformer 18 having a primary winding 19 and a plurality of secondary windings 21, 22 and 23. The conductors 11 and 12 connect the input lines 1 and 2 to the terminals of said primary winding 19.

A secondary winding 21 is connected by one of its terminals 24 through a capacitor 26 to an output terminal 27. A transformer 28 has its primary winding 29 connected between said output terminal 27 and a tap 31 intermediate the ends of the secondary winding 21. The other terminal 32 of the secondary winding 21 is connected through a pair of rectifiers 33 and 34 to the output terminal 27. Said rectifiers are positioned in opposite polarity with respect to each other, with their positive terminals connected together. Said rectifiers are here shown as diodes but they may equally well be other forms of rectifiers, including dry disk, as selenium, rectifiers.

A point 36, positioned anywhere between the rectifier 34 and the output terminal 27 is connected to the positive terminal of a rectifier 37 and its negative terminal is connected to a junction point 38. Another connecting point 39, positioned anywhere between the rectifier 33 and the terminal 32, is connected to the positive terminal of a rectifier 41 and its negative terminal is connected to the junction point 38. The junction point 38 is then connected to the anode of vacuum triode 42 whose cathode is connected to a point 43 positioned intermediate the rectifiers 33 and 34.

The cathode of the triode 42 is also connected by conductor 44 to one terminal 46 of the resistance portion 45 of a potentiometer 47, of which the slider is connected by a conductor 48 to the control electrode of the triode 42.

The terminals 46 and 49 of the resistance 45 are connected to a source of constant potential and a source of varying potential, said sources being in series with each other, which will now be described. A capacitor 40 is connected between the terminal 49 and the conductor 44 in parallel with the resistance 45.

The source of constant potential commences with the secondary winding 22 of the transformer 18. The respective ends of said secondary winding 22 are connected to the anodes of a double rectifier 51. The cathode of said rectifier is connected through a resistance 52 to a junction point 53. Said junction point is then connected to the anode of the voltage regulator tube 54 of any well known type, and the cathode thereof is connected to a center tap 56 on the secondary winding 22. A connecting point 57 located between the cathode of the voltage regulator tube 54 and the center tap 56 is connected to the terminal 46 of the resistance 45.

The variable source of potential above mentioned, commences with the secondary winding 23 of the transformer 18. The ends of the winding 23 are connected respectively to each of the anodes of the double rectifier 58. The cathode of said rectifier is connected to a junction point 59 which is in turn connected to the junction point 53. The junction point 59 is then connected through the resistance portion 61 of a potentiometer 62 to the center tap 63 of the secondary winding 23. The slider 60 of the potentiometer 62 is connected to the terminal 49 of the resistance 45.

It will be observed that the constant voltage existing between 57 and 53 is in opposition to the variable voltage existing between the point 59 and the slider 60. Thus, the actual voltage difference between the points 46 and 49 will be the difference between the said constant voltage and the variable voltage.

The transformer 28 has two secondary windings indicated at 64 and 66. The respective ends of the winding 64 are connected to the control electrode and to the cathode of the thyratron 17 and the ends of the winding 66 are connected respectively to the control electrode and to the cathode of the thyratron 16.

*Operation*

With a source of alternating potential supplied to the conductors 1 and 2, the transformer 4 is energized thereby energizing the output terminals in a conventional manner subject to the control of the electric valves here comprising the thyratrons 16 and 17.

Said valves are normally conductive and are rendered non-conductive in a conventional manner by energization of the transformer 28 and said transformer is energized in a desired phase relationship with the source in response to the magnitude of resistance placed in the phase shift circuit by the vacuum triode 42. It will be observed that an impulse from said secondary winding 21 traveling in one direction will appear at the point 39 to be stopped by the rectifier 33, will travel through the rectifier 41 to the point 38, will be stopped by the rectifier 37 but will travel through the triode 42 to the point 33 and thence through the rectifier 34 to the point 27 and the capacitor 26 back to the other end of the secondary winding 21. A pulse in the opposite direction on the secondary winding 21 will travel through the capacitor 26 to the point 36, will be stopped by the rectifier 34 but will travel through the rectifier 37 to the point 38, will be stopped by the rectifier 41 but will travel through the vacuum triode 42 to the point 43 and thence through the rectifier 33 to the other end 32 of the secondary winding 21. Thus, the resistivity of the vacuum triode 42 will constitute a variable and controllable resistance within the phase shift circuit for controlling the magnitude of the phase shift appearing at the output terminals 27 and 31 thereof.

The potential placed between the control electrode and cathode of the triode 42 is determined by the potential existing between the points 46 and 49 and by the position of the slider on the resistance 45.

The capacitor 40 absorbs the fluctuations due to the A. C. wave and thus holds the triode 42 of substantially constant resistivity for any given potential difference between the points 46 and 49.

Potential originating in the secondary winding 22 travels through the voltage regulator 54 and thereby establishes an exactly predeterminable voltage drop between the points 57 and 53. This voltage drop will remain constant regardless of changes in voltage occurring within the secondary winding 22.

Voltages appearing in the secondary winding 23 travel through the rectifier 58 and through the resistance 61 to establish a voltage drop between the point 59 and the slider 60 of the potentiometer 62, which voltage drop is variable in response to variation in voltage between the lines 1 and 2. Thus, the voltage drop existing between the points 46 and 49 will respond to change in voltage between the point 59 and the slider 60, with the constant voltage drop provided by the voltage regulator 54 acting as a point of contant zero reference corresponding to the point of lowest expected line voltage.

More specifically, an increase in voltage between the supply lines 1 and 2 will increase the voltage drop between the point 59 and the slider 60, which is in opposition to the voltage drop across the regulator 54, and thereby affect the voltage difference between the points 46 and 49 in the direction of making the grid of tube 42 more negative. This will increase the resistivity of the triode 42 which will in turn increase the phase shift applied to the transformer 28. Such phase shift when applied to thyratrons 16 and 17 will diminish the conductive period of said thyratrons with respect to the pulses applied thereto by the supply lines and thereby diminish the voltage of the output of the transformer 4 in an amount proportional to the increase in voltage in the supply lines 1 and 2. A decrease in the voltage appearing in the supply lines 1 and 2 will decrease the voltage drop between the point 59 and the slider 60 and thereby affect the voltage difference between the points 46 and 49 in the direction of making the grid of tube 42 more positive. This will render the triode 42 more conductive, that is, of lower resistivity, and thus diminish the phase shift applied to the transformer 28. This will lessen the phase shift applied to the thyratrons 16 and 17 with respect to the pulses on the input lines 1 and 2 and thereby increase the voltage of the output appearing on the secondary winding 6 in proportion to the decrease in the voltage applied to the lines 1 and 2.

In adjusting the equipment for a particular operation, the potentiometers 47 and 62 should be adjusted so that the triode 42 reaches its maximum conductivity when the voltage between the lines 1 and 2 is at the minimum expected level in order that at this point a minimum phase shift may be imposed onto the thyratrons 16 and 17. Thus, in adjusting the mechanism for operating under given conditions, the potentiometer 62 is first adjusted with the line voltage at its minimum expected value to provide a minimum voltage drop between the points 59 and the slider 60 whereby to effect maximum conductivity of the triode 42. The potentiometer 47 is then adjusted to provide a minimum potential difference between the cathode and control electrode of the triode 42 at the lowest expected line voltage. As one particular example, it has been found that when utilizing a Hytron 6216 type vacuum tube, a zero basis on the control electrode provides the maximum conductivity and the largest output voltage for the transformer 4. Next the potentiometer 62 is adjusted to give the necessary bias to the grid of the triode 42 at the highest expected line voltage. In the same example above mentioned, this means a 12 volt difference between the cathode and control electrode. With these simple adjustments, and with the apparatus arranged as above described and shown, any variation between the two extremes for which the equipment is adjusted, will produce substantially the same output voltage. Specifically, in the example above mentioned, variations of as much as 30% in the input voltage have produced a constant voltage at the output.

While a specific embodiment of the invention has been used herein for illustrative purposes, many variations within the scope of the invention will be recognized by those skilled in the art. Hence, the claims should be interpreted to include such variations, excepting as they by their own terms expressly provide otherwise.

I claim:

1. In a phase shift circuit, a resistance element comprising: a pair of terminal points; a pair of rectifiers connected in series between said terminal points and having their anodes connected to each other and their cathodes connected to said terminal points; a second pair of rectifiers connected in series with each other and between said terminal points and having their cathodes connected to each other and their anodes connected to said terminal points; a vacuum tube having its anode connected to the cathodes of said second pair of rectifiers and its cathode connected to the anodes of said first pair of rectifiers; and means for applying a controllable potential between the control electrode and the cathode of said vacuum tube.

2. In a phase shift circuit, a resistance element comprising: a pair of terminal points; a first pair of rectifiers connected in series between said terminal points with first like ends thereof connected to each other and second like ends connected to said terminal points; a second pair of rectifiers connected in series with each other and between said terminal points and having the ends of each thereof corresponding to said first like ends of said first pair of rectifiers connected to said terminal points and the other ends of each thereof connected to each other; a vacuum tube having the principal electrode which is of opposite polarity to that of said first like ends of said first pair of rectifiers connected to said first like ends and its other principal electrode connected to said other ends of said second pair of rectifiers; and means for applying a controllable potential between the control electrode and the first mentioned principal electrode of said vacuum tube.

3. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves; said last named means including a regulator source of constant potential, a regulator source of variable potential in opposition to said source of constant potential, said variable potential varying in proportion to variations in voltage of said line source, and means applying the net potential supplied by said two regulator sources between the cathode and control electrode of said vacuum tube.

4. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a resistance element comprising a pair of rectifiers connected in opposite polarity with respect to each other and in series with each other, a second pair of rectifiers connected in opposite polarity with respect to each other and in parallel with said first pair of rectifiers and in opposite polarity with respect to respectively adjacent ones of said first pair of rectifiers, a vacuum tube having its anode connected to the cathodes of that pair of rectifiers whose cathodes are connected together and its cathode connected to the anodes of that pair of rectifiers whose anodes are connected together; means responsive to changes in voltage of said source for changing the potential imposed between the cathode and control electrode of said vacuum tube and thereby varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves.

5. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves, and said last named means including a potentiometer having one end of its resistance element connected to the cathode of said vacuum tube and its slider connected to the control electrode of said vacuum tube, and the other end of said resistance element connected through a capacitor to said first named end of said resistance element; a source of constant potential having its negative end connected to said first end of the resistance element of said potentiometer, and a source of variable potential, varying in proportion to variations in the voltage of said source and connected in series between the positive end of said source of constant voltage and said other end of the resistance element of said potentiometer, and in opposite polarity with respect to said source of constant voltage.

6. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phast shift means as to increase the period of conductivity of said electric valves, and said last named means including a first potentiometer having a first end of its resistance element connected to the cathode of said vacuum tube and its slider connected to the control electrode of said vacuum tube; a source of constant potential having its negative end connected to said first end of the resistance element of said first potentiometer, and a source of variable voltage including the resistance element of a second potentiometer which voltage varies in proportion to the voltage of said line source and having one end of the resistance element of said second potentiometer connected to the positive end of said source of constant voltage and having the slider of said resistance element of said second potentiometer connected to the second end of the resistance element of said first potentiometer, said source of variable voltage being connected in opposite polarity with respect to said source of constant voltage.

7. In a voltage regulating device for use with a line source of alternating potential and a load, the combination comprising: a pair of back-to-back connected electric valves connected in series between said source of said load; means, including a phase shift circuit, for controlling the energization of the control electrode of said electric valves, said phase shift circuit including a vacuum tube; means automatically responsive to changes in voltage of said source for varying the magnitude of resistance of said vacuum tube, said last named means being so arranged that an increase in voltage will change the phase of the energy output of said phase shift circuit in such a direction as to decrease the period of conductivity of said electric valves and a decrease of said last named voltage will so change the phase of the energy output of said phase shift circuit as to increase the period of conductivity of said electric valves, and said last named means including a potentiometer having one end of its resistance element connected to the cathode of said vacuum tube and its slider connected to the control electrode of said vacuum tube, and the other end of said resistance element connected to said one end of said resistance element; a source of constant potential having its negative end connected to said one end of the resistance element of said potentiometer, and a source of variable potential, varying in proportion to variations in the voltage of said alternating source and connected in series between the positive end of said source of constant potential and said other end of the resistance element of said potentiometer, and in opposite polarity with respect to said source of constant potential.

8. A voltage regulating device for use with a source of alternating potential and a load, comprising in combination: an electrically operable switch connected in series between said source and said load; means including a phase shift circuit for effecting a controlled on-off operation of said switch in a selectable relationship with the phase of said alternating source, said phase shift circuit including a vacuum tube whereby variation of the resistance of said vacuum tube will effect a controlled change in the phase relationship between the input and output of said phase shift circuit; means responsive to a change in voltage of said alternating potential for varying the resistance of said vacuum tube, said last named means being so arranged that an increase in said alternating potential will act through said phase shift circuit to decrease the period of conductivity of said switch and a decrease in said alternating potential will act through said phase shift means to increase the period of conductivity of said switch, said last named means including a first resistance element having one end thereof connected to the cathode of said vacuum tube and its other end connected to the control electrode of said vacuum tube; a source of constant potential having its negative end connected to said one end of said resistance element; a source of variable potential connected for varying in proportion to variation in the voltage of said alternating source and connected in series between the positive end of said source of constant voltage and said other end of said resistance element.

9. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of the resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves, and said last named means including a resistance element having its one end connected to the cathode of said vacuum tube and its other end connected to the control electrode of said vacuum tube, and circuitry responsive to variations in the voltage of said alternating potential for imposing a voltage across said resistance element which voltage is variable in response to the voltage of said alternating potential.

10. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves, said last named means including a resistance element having one end connected to the cathode of said vacuum tube and the other end connected to the control electrode thereof, circuitry connected to said alternating source and providing at its terminals an output potential varying in response to the voltage appearing at said alternating source, and means respectively connecting the output terminals of said circuitry with the ends of said resistance element and a capacitor connecting the ends of said resistance element.

11. In a voltage regulating device for use with a line source of alternating potential and a load, the combination comprising: a pair of back-to-back connected electric valves connected in series between said source and said load; means, including phase shift means, for controlling the energization of the control electrode of said electric valves, said phase shift means including a vacuum tube; means automatically responsive to changes in voltage of said source for varying the magnitude of resistance of said vacuum tube, said last named means being so arranged that an increase in voltage will change the phase of the energy output of said phase shift means in such a direction as to decrease the period of conductivity of said electric valves and a decrease of said last named voltage will so change the phase of the energy output of said phase shift means as to increase the period of conductivity of said electric valves, said last named means including a circuit connected to said alternating source and producing at its output terminals a voltage proportional to the voltage supplied at any given instant by said alternating source, a capacitor connecting said terminals and conductors connecting said terminals respectively to the cathode and control electrode of said vacuum tube.

References Cited in the file of this patent

UNITED STATES PATENTS

| | | |
|---|---|---|
| 2,246,179 | Lord | June 17, 1941 |
| 2,306,230 | Somerville | Dec. 22, 1942 |
| 2,393,884 | Callender | Jan. 29, 1946 |
| 2,451,834 | Kubler | Oct. 19, 1948 |